US012618483B2

(12) United States Patent
    Lord

(10) Patent No.:  US 12,618,483 B2
(45) Date of Patent:       May 5, 2026

(54) DRAIN VALVE

(71) Applicant: Gardner Denver Ltd, West Yorkshire (GB)

(72) Inventor: Abel Justin Lord, Stowmarket (GB)

(73) Assignee: GARDNER DENVER LTD., West Yorkshire (GB)

( * ) Notice: Subject to any disclaimer, the term of this patent is extended or adjusted under 35 U.S.C. 154(b) by 752 days.

(21) Appl. No.: 17/880,940

(22) Filed: Aug. 4, 2022

(65) Prior Publication Data

US 2023/0039089 A1      Feb. 9, 2023

(30) Foreign Application Priority Data

Aug. 5, 2021    (EP) ..................................... 21189932

(51) Int. Cl.
    F16K 11/044        (2006.01)
    B01D 36/00        (2006.01)
(52) U.S. Cl.
    CPC .......... F16K 11/044 (2013.01); B01D 36/003 (2013.01)
(58) Field of Classification Search
    None
    See application file for complete search history.

(56) References Cited

U.S. PATENT DOCUMENTS 3,103,229 A  *  9/1963  Smith ...................... F02C 7/232
                                                    137/107
3,234,968 A  *  2/1966  Frantz ................. F15B 13/0402
                                                    137/625.68

2011/0041920 A1     2/2011  Abdalla
2014/0261773 A1     9/2014  Chajec
2020/0309105 A1 * 10/2020  Hayama .................. F16K 11/24

FOREIGN PATENT DOCUMENTS

EP          3726054 A2    10/2020

OTHER PUBLICATIONS

Extended European Search Report for Application No. 21189932.3 dated Jan. 27, 2022, 6 pages.

* cited by examiner

*Primary Examiner* — Hayden Brewster
(74) *Attorney, Agent, or Firm* — Edell, Shapiro & Finnan, LLC

(57)        ABSTRACT

A drain valve for a pressurised fluid chamber comprises a collection chamber for collecting pressurised fluid from the pressurised fluid chamber; a vent chamber for venting the pressurised fluid from the collection chamber; a master valve between the collection chamber and the vent chamber; and a slave valve between the pressurised fluid chamber and the collection chamber. The master valve is configured to open the slave valve when the master valve is closed, and to close the slave valve when the master valve is open. The master valve is configured to open the slave valve to allow pressurised fluid from the pressurised fluid chamber to enter the collection chamber, and configured to close the slave valve to allow pressurised fluid from the collection chamber to enter the vent chamber. The master valve and the slave valve cannot be shut at the same time.

18 Claims, 4 Drawing Sheets

710

720

DRAIN VALVE

TECHNICAL FIELD

The present disclosure relates to a drain valve and a method for draining. More particularly, the present disclosure relates to a drain valve for a pressurised chamber and method for draining a pressurised chamber when filtering gases at high pressures.

BACKGROUND

Drain valves are used for draining a fluid from a container. In filtration applications where a filter element or cartridge is held in a chamber of a pressurised housing, the element will be ideally sized in order to maintain maximum filtration efficiency. A major factor considered in this sizing is the velocity of the gas stream though the filtration media. If the chamber requires periodic draining of the separated fluid by opening a tapping in the bowl to a much lower pressure, such as atmospheric, the pressure in the chamber quickly reduces whilst the mass flow rate stays the same and therefore the velocity through the filtration element will increase beyond desirable limits. This may cause physical failure of the element, in extreme cases bursting of the element, or may cause the separated fluid which has been collected in the filtration media to return to the previously filtered gas stream.

To prevent this undesirable operation, the filtration element tends to be sized larger than is required during the normal operation, the non-drain period. This means that the element spends much of it's time operating with the gas velocity below the optimal to give maximum efficiency. A problem is thus to allow the chamber to be drained without a significant loss of pressure so that the filtration element can be correctly sized for optimal efficiency.

A chamber containing filtration media, or mechanical separation devices, is required to be periodically drained to remove the separated fluid is subjected to a fatigue cycle during this periodic draining. A fatigue cycle is also experienced when the machine or process the filtration chamber is part of stops or is interrupted. In compressor applications, typically the chambers which house breathing air filtration are manufactured from aluminium so as to keep their weight low and to avoid the corrosion seen with ferrous materials due to moisture in the air. Aluminium is less resistant to fatigue, and does not display a true endurance limit, therefore aluminium parts have to be replaced after a certain period of time or number of cycles.

The current state of the art practise of draining of chambers of high pressure compressors is by periodically venting the chambers of the separators. However, this results in the compressor not delivering compressed gas from the outlet during such periodic venting, the drain period, as the gas is venting out of the chambers of the separators. The way of solving this is to employ a delivery buffer vessel to ensure continuous gas flow during the drain period. If a compressor is to support any sort of downstream continuous process that requires a steady and continuous flow of gas, then a delivery buffer vessel is to be used. It is desirable to have a compressor that does not require the use of a downstream buffer vessel. It is also desirable to have a valve that reduces any reduction of flow rate in the gas to be delivered by the compressor.

A valve that allows the chamber to be drained without a significant loss of pressure and that on shut down of the system maintained pressure in the housing for an extended period, not drain as normal, would extend the life of parts of a separation device by reducing the number of fatigue cycles. A problem is to provide a valve that fulfils all the requirements above, such as draining without a significant loss of pressure, reducing fatigue cycles, maximize efficiency, and maintaining pressure on shut down.

Other ways of draining a filter housing is to use a float valve, or a high pressure solenoid valve. However, these two options are not reliable at high pressure and can therefore not be used. The use of ball valves or a shuttle valve are also not options, because they are too large and expensive. Ball valves and shuttle valves have also reliability issues. It is therefore desirable to provide a drain valve and a method for draining that do not have the inherent drawbacks and properties of ball valves, shuttle valves, float valves, or high pressure solenoid valves.

SUMMARY OF THE INVENTION

It is an object of the present invention to provide a drain valve for a pressurised fluid chamber and a method for draining a pressurised chamber with such a drain valve. This object can be achieved by the features as defined by the independent claims. Further enhancements are characterised by the dependent claims.

According to one embodiment, a drain valve for a pressurised fluid chamber is disclosed. The drain valve comprises a collection chamber for collecting pressurised fluid from the pressurised fluid chamber; a vent chamber for venting the pressurised fluid from the collection chamber; a master valve between the collection chamber and the vent chamber; and a slave valve between the pressurised fluid chamber and the collection chamber. The master valve is configured to open the slave valve when the master valve is closed, and to close the slave valve when the master valve is open. The master valve is configured to open the slave valve to allow pressurised fluid from the pressurised fluid chamber to enter the collection chamber, and configured to close the slave valve to allow pressurised fluid from the collection chamber to enter the vent chamber. The master valve and the slave valve cannot be shut at the same time.

According to one embodiment, the drain valve may further comprises a valve seat. The valve seat may comprise a master valve seat and a slave valve seat. The valve seat may be a single uniform piece of steel.

According to one embodiment, the drain valve may further comprises a spring. A force of the spring may urge the slave valve against the slave valve seat. According to one embodiment, the slave valve may further comprise a spring retaining plate. The spring retaining plate may comprise through holes.

According to one embodiment, the slave valve may comprise a material to seal against the slave valve seat. The material may be softer than a material of the master valve.

According to one embodiment, the master valve may move at least partly within the valve seat. The master valve may be configured to always move at least partly within the valve seat.

According to one embodiment, the master valve and the slave valve may be co-axially arranged. According to one embodiment, the master valve, the slave valve, and the valve seat may all three be co-axially arranged.

According to one embodiment, the drain valve may further comprise the pressurised fluid chamber. The pressurised fluid chamber may comprise a filter. According to one embodiment, the valve seat may be integrated into a base of a filtration assembly. Alternatively, the valve seat may be remotely mounted and piped from a filtration assembly.

According to one embodiment, the collection chamber may have a volume that is further away from the master valve seat than one or more passages are away from the master valve seat. The one or more passages may be from the volume to the master valve seat.

According to one embodiment, a method for draining a pressurised chamber with a drain valve is disclosed. The drain valve comprises a collection chamber for collecting pressurised fluid from the pressurised fluid chamber; a vent chamber for venting the pressurised fluid from the collection chamber; a master valve between the collection chamber and the vent chamber; and a slave valve between the pressurised fluid chamber and the collection chamber. The master valve is configured to open the slave valve when the master valve is closed, and to close the slave valve when the master valve is open. The master valve is configured to open the slave valve to allow pressurised fluid from the pressurised fluid chamber to enter the collection chamber, and configured operable to close the slave valve to allow pressurised fluid from the collection chamber to enter the vent chamber. The master valve and the slave valve cannot be shut at the same time. The method comprises switching between a first mode and a second mode, in any order. The first mode being closing the master valve and opening the slave valve to collect pressurised fluid in the collection chamber. The second mode being closing the slave valve and opening the master valve to vent pressurised fluid from the collection chamber to the vent chamber.

According to one embodiment, a time duration of the first mode may be forty times, or more, than a time duration of the second mode. The first mode can run for a long time, for example 12 or 24 hours, or during, or always during, normal operation, while the second mode can run for a short time, for example during, or only during, shutdown.

According to one embodiment, the method may further comprise that only by operating the master valve the switching between the two modes is made.

According to one embodiment, the master slave may be operated by a pilot fluid from a compressor for the pressurised chamber. Alternatively, the master slave may be operated by a solenoid mechanism.

According to one embodiment, only a pneumatic signal from the compressor for the pressurised chamber may be used for switching between the first mode and the second mode.

At least one embodiment of such a drain valve and method of draining allows a chamber to be drained without a significant loss of pressure. This allows that a filtration element can be correctly sized for optimal efficiency. At least one embodiment of such a drain valve and method of draining allows maintaining pressure on shut down for an extended period and extends life of parts by reducing the number of fatigue cycles. At least one embodiment provides an easy assembly of the drain valve, and inexpensive manufacturing of the same. At least one embodiment provides a reliable drain valve, with low maintenance. At least one embodiment provides a drain valve that keeps the vessel or chamber to which it is attached, or integrated into, effectively closed at all time, whether a pneumatic signal is present or not. At least one embodiment provides by design that a certain amount of fluid is removed on each cycle with minimal pressure drop within the attached vessel or chamber. At least one embodiment provides a drain valve that requires only a single pneumatic signal for full operation, i.e.

no additional control system or power supply is required. At least one embodiment provides a valve that greatly reduces, almost totally eliminates, the reduction in delivered gas flow rate, such that in most cases use of a downstream buffer vessel is not required.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any embodiment disclose herein may be combined with any other embodiment disclosed herein.

BRIEF DESCRIPTION OF THE DRAWINGS

The accompanying drawings illustrate presently exemplary embodiments of the disclosure, and together with the general description given above and the detailed description of the embodiments given below, serve to explain, by way of example, the principles of the disclosure.

DETAILED DESCRIPTION

Figure 1:
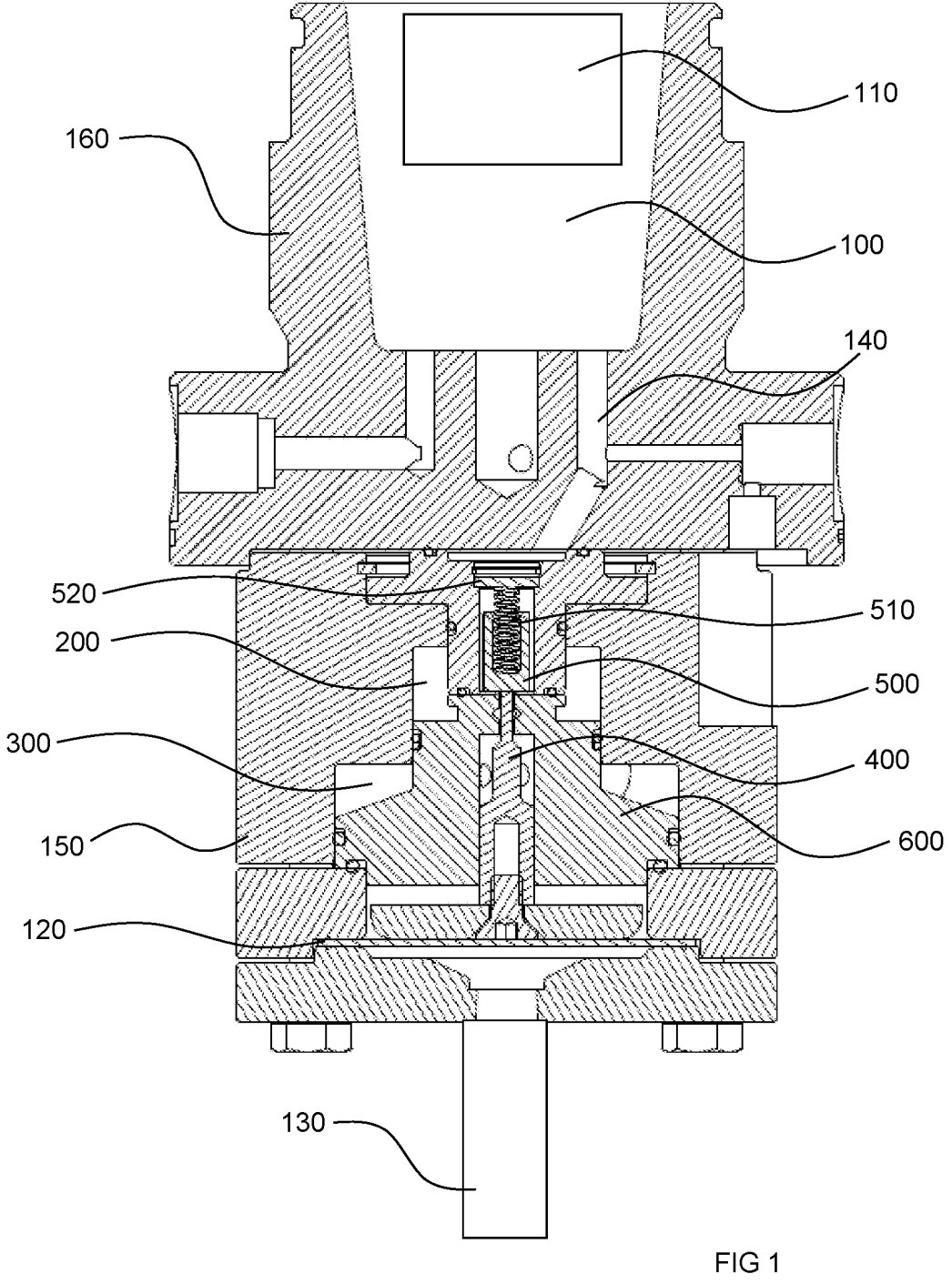
FIG. 1 is a diagrammatic illustration of a drain valve according to an exemplary embodiment of the present disclosure, the drain valve is shown in a cut through section along a central axis of the drain valve.
Figure 2:
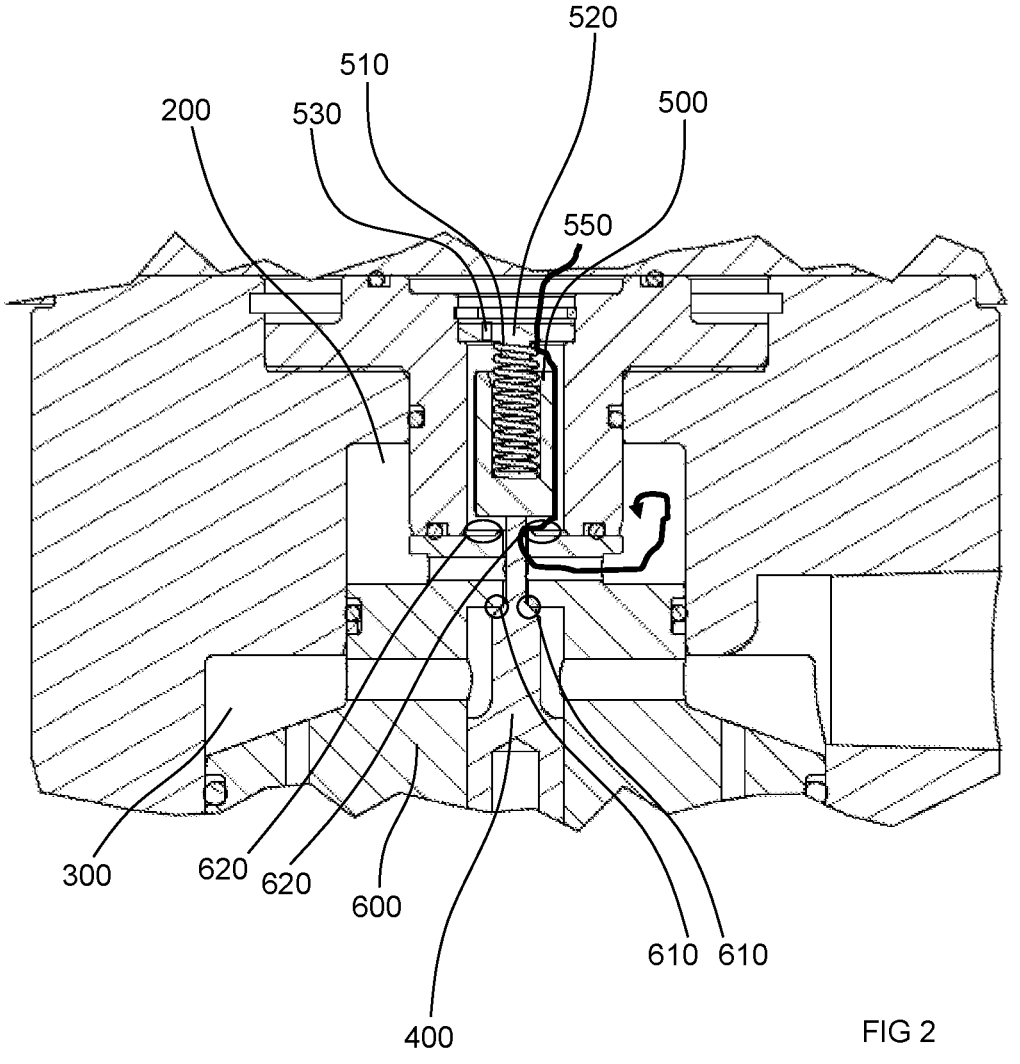
FIG. 2 is a diagrammatic illustration of details of the drain valve in a first mode according to an exemplary embodiment of the present disclosure, the drain valve is shown in a cut through section along a central axis of the drain valve, the section has been rotated compared with FIG. 1.
Figure 3:
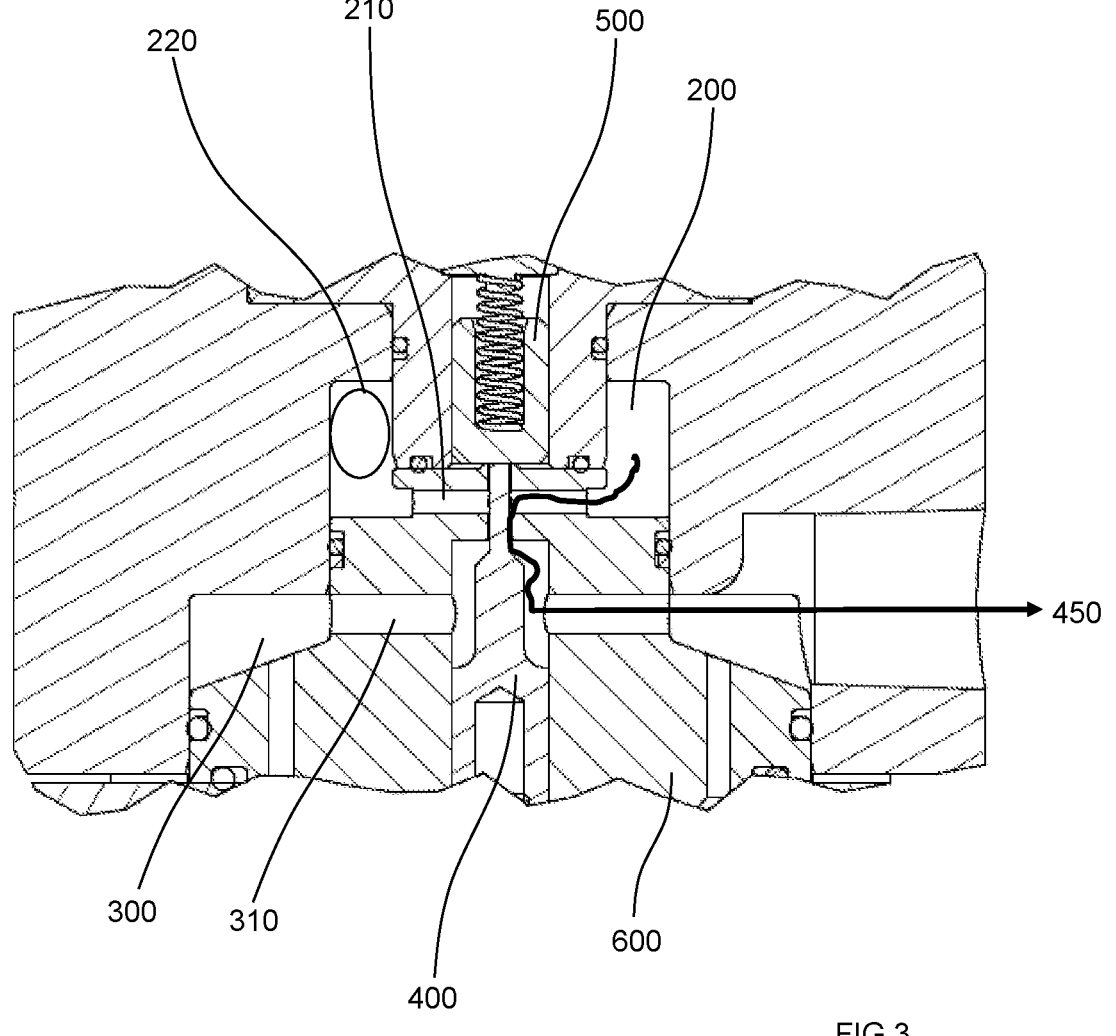
FIG. 3 is a diagrammatic illustration of details of the drain valve in a second mode according to an exemplary embodiment of the present disclosure, the drain valve is shown in the same cut through section along a central axis of the drain valve as FIG. 2.
Figure 4:
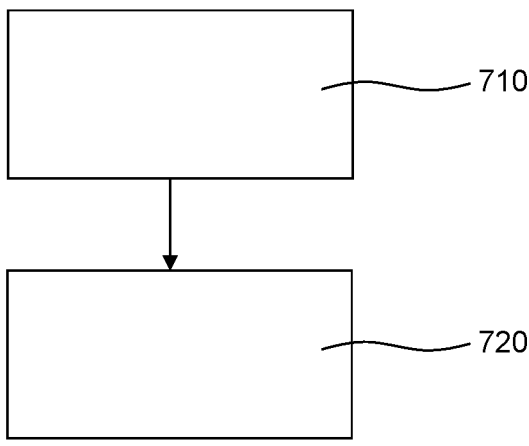
FIG. 4 is a flow chart of a method according to an exemplary embodiment of the present disclosure.

The following describes preferred and exemplary embodiments for at least one way of carrying out the drain valve and the method of draining with the drain valve. FIG. 1 illustrates an exemplary embodiment where the drain valve is illustrated in a cut through section along a central axis of the drain valve. FIGS. 2 and 3 illustrate central parts of the same drain valve in a cut through section along a central axis of the drain valve, but in two different modes of operation. FIGS. 2 and 3 show the same drain valve as in FIG. 1, but the cut through section along the central axis has been turned to show more features not visible in FIG. 1. FIG. 4 is a flow chart of the draining method illustrating the first mode and the second mode.

The drain valve is suitable for draining a pressurised chamber 100 containing a fluid. The fluid may be a mixture of liquid and gas, for example air containing moisture, such as water and/or oil. Such pressurised chambers may be used in the field of producing breathing air, or other technical fields where pressurised chambers for a fluid is used. A pressurised fluid chamber 100 that can be used in combination with any embodiments described herein is a pressurised chamber that needs to be drained constantly at intervals while maintaining, or substantially maintaining, the pressure in the chamber. The pressurised fluid chamber 100 is suitable to contain a pressurised fluid, but the fluid chamber needs not always to be pressurised. An operating pressure for the fluid for the drain valve and the method may be 500 kPa to 50000 kPa (5 to 500 bar), preferably 30000 kPa to 41500 kPa (300 to 415 bar), preferably around 10000 kPa (100 bar).

According to one embodiment, a drain valve for a pressurised fluid chamber 100, is illustrated by FIG. 1. The drain valve comprises a collection chamber 200 for collecting pressurised fluid from the pressurised fluid chamber 100, and a vent chamber 300 for venting the pressurised fluid from the collection chamber 200, preferably to vent any fluid out to atmospheric pressure. The drain valve also comprises a master valve 400 between the collection chamber 200 and the vent chamber 300, and a slave valve 500 between the pressurised fluid chamber 100 and the collection chamber 200. The slave valve 500 is for shutting off, or opening, of any fluid flow from the pressurised fluid chamber 100 to the collection chamber 200. The slave valve 500 is the first valve, closest to the pressurised fluid chamber 100, that the fluid to be drained must pass through. The collection chamber 200, vent chamber 300, the master valve 400, and the slave valve 500 may all be within a housing 150. The housing 150 may be connected to the pressurised fluid chamber 100. The collection chamber 200 may have one or more passages 210 for leading collected fluid from the collection chamber 200 to the vent chamber 300. The master valve 400 may be made out of stainless steel. The vent chamber 300 may have one or more vent passages 310 for venting the fluid out to the atmosphere.

According to one embodiment, the master valve 400 is configured to open the slave valve 500 when the master valve 400 is closed, and to close the slave valve 500 when the master valve 400 is open. The master valve 400 is configured, operable, to open the slave valve 500, i.e. while the master valve 400 is closed, to allow pressurised fluid from the pressurised fluid chamber 100 to enter the collection chamber 200, and configured, operable, to close the slave valve 500, i.e. while the master valve 400 is open, to allow pressurised fluid from the collection chamber 200 to enter the vent chamber 300. Preferably this opening and closing of the slave valve 500 is done by only the master valve 400, i.e. by the master valve 400 itself. The master valve 400 may contact and push, upwards in FIG. 1, the slave valve 500 to open the slave valve 500. The master valve 400 may allow the slave valve 500 to close by moving away from the slave valve 500, downwards in FIG. 1, so that the master valve 400 is not in contact with the slave valve 500 when the slave valve 500 is closed. In this way the slave valve 500 can be operated by only operating the master valve 400. The master valve 400 and the slave valve 500 cannot be shut at the same time. The master valve 400 and the slave valve 500 may be two separate features.

The collection chamber 200 may be connected to a filtration chamber, the pressurised fluid chamber 100, or vessel, by a drain tube 140 as shown in FIG. 1, via the slave valve 500. The drain valve may be mounted remotely and then a separate pipe (not illustrated) may be used to connect the pressurised fluid chamber 100 to the collection chamber 200 via the slave valve 500. The drain valve may be integrated into a base or a bowl of a typical filtration assembly, for example a Gardner Denver PAS unit, but the drain valve may be self contained, remotely mounted and piped to from the filtration assembly.

The collection chamber 200 is connected to the vent chamber 300 via the master valve 400. The master valve 400 can thus open to let fluid pass from the collection chamber 200 to the vent chamber 300. The vent chamber 300 may be open to the outside atmospheric pressure, e.g. 100 kPa (1 bar). Preferably the vent chamber 300 is vented to the atmosphere, but the vent chamber 300 may vent, or recover, the fluid in a pressurised container, such as 200-600 kPa (2-6 bar). The vent chamber 300 may use a safety valve, in the same pressure range, to allow fluid to pass to the pressurised container. The collection chamber 200 may have a maximum allowable working pressure that is equal to the pressurised fluid chamber 100. The vent chamber 300 may have a lower maximum allowable working pressure than that of the collection chamber 200.

The master valve 400 and the slave valve 500 are configured such that both valves cannot be shut at the same time. The two valves may only for a brief transient period be open at the same time. For the purposes of understanding the operation of the drain valve is can be considered that when one is closed the other is open. However, according to one embodiment, the master valve 400 and the slave valve 500 are configured such that both valves can be shut at the same time. In such an embodiment the master valve 400 may open the slave valve 500 first after the master valve 400 has closed, and the slave valve 500 may close before the master valve 400 opens.

According to one embodiment, only the master valve 400 is directly operated for causing the draining. For example, the shape of the master valve 400 may operate the slave valve 500. For example, the master valve 400 may push directly the slave valve 500. The master valve 400 may be a separate valve from, not connected to or part of, the slave valve 500. In the absence of the master valve 400, or in the absence of any operation of the master valve 400, the slave valve 500 remains closed. It remains closed because of the spring 510 and/or the pressure from the pressurised fluid chamber 100. The master valve 400 and the slave valve 500 may be substantially cylindrical in shape. The master valve 400 may comprise a protrusion that may act directly on the slave valve 500. The master valve 400 may seal against a master valve seat 610 and comprise an extension that extends, at least, preferably 1 to 5 millimetres more than, between the master valve seat 610 and a slave valve seat 620. The master valve 400 may push, upwards in FIG. 1, the slave valve 500 open against the spring force of the spring 510. When the master valve 400 is moved downwards in FIG. 1, then the spring 510 and any pressure in the pressurised fluid chamber 100 closes the slave valve 500. In the absence of a pressure in the pressurised fluid chamber 100 the spring 510 will thus ensure that the slave valve 500 is closed, when the master valve is moved downwards in FIG. 1.

According to one embodiment, the drain valve may further comprise a valve seat 600. As indicated with circles in FIG. 2, the valve seat 600 comprises the master valve seat 610 for the master valve 400, and the slave valve seat 620 for the slave valve 500. The master valve 400 may engage the master valve seat 610 to close the master valve 400, and this may be, for example, metal engaging metal. Such a valve can be made very accurate and is inexpensive and reliable. The slave valve 500 may engage the slave valve seat 620 to close the slave valve 500, and this may be, for example, the slave valve 500 made out of nylon and the slave valve seat 620 made out of metal. The valve seat 600 may be made out of steel, for example stainless steel, instead of aluminium. The valve seat 600 may be one single uniform piece, for example made out of steel, for example stainless steel. There may be sealing elements, such as for example O-rings, between the valve seat 600 and the housing 150. The housing 150 may be made out of aluminium. The use of a single uniform piece as the valve seat 600 a very reliable drain valve may be achieved that is also very easy to manufacture and assemble and maintain. The shape of the valve seat 600 is configured such that when it is installed in the housing 150 the two separate collection chamber 200 and vent chamber 300 are formed. The valve seat 600 may be made entirely out of stainless steel. The valve seat 600 may be one uniform solid consistent piece, which allows for easy assembly. The valve seat 600 may have the master valve seat 610 and the slave valve seat 620 arranged opposite each other and both valves being integral parts of the one uniform solid consistent piece that makes up the valve seat 600. The master valve seat 610 may be a conical shape in the valve seat 600 that can seal against a corresponding conical shape on the master valve 400. The slave seat 620 may be a protrusion along a circle around an opening through which the master valve 400 can open the slave valve 500. The slave valve 500 can seal against the protrusion.

According to one embodiment, the drain valve may further comprise a spring 510. A force of the spring 510 may urge the slave valve 500 against the slave valve seat 620. The spring 510 may be a coiled steel spring. In this way the drain valve is configured to be closed if no pressure or force acts on drain valve. This allows a fluid pressure in the pressurised fluid chamber 100 to be maintained. The spring 510 may push the master valve 400 open when the spring 510 closes the slave valve 500.

According to one embodiment, the slave valve 500 may further comprise a spring retaining plate 520. The spring retaining plate 520 may comprising a plurality of through holes 530 for the fluid to pass through. Only one through hole is illustrated in FIG. 2, and further through holes 530 are present next to the through hole 530 going through the top of the T-shaped spring retaining plate 520 in FIG. 2. The spring retaining plate 520 may be substantially T-shaped with the spring 510 coiled around the base of the T-shaped spring retaining plate 520. The spring retaining plate 520 may be held in place by the housing 150. The spring retaining plate 520 may be positioned between the slave valve 500 and the pressurised fluid chamber 100.

According to one embodiment, the slave valve 500 may further comprise a material to seal against the slave valve seat 620, and the material may be softer than a material of the master valve 400. The material may be for example nylon. The material may simply be in contact with the slave valve seat 620 to shut off the slave valve 500.

According to one embodiment, the master valve 400 may move at least partly within the valve seat 600. The master valve 400 may be centrally placed in the valve seat 500. The master valve 400 may be slidably arranged inside, or at least partly inside, the valve seat 600. The master valve 400 may have a membrane 120 attached to one end of the master valve 400. The other end of the master valve 400 may engage the slave valve 500. The membrane 120 may be flexible and may be clamped circumferentially within the valve seat 600. In this way dirt is prevented from entering the drain valve. By flexing the membrane 120, by for example using pneumatic or a solenoid, the master valve 400 may be moved, for example axially moved within the valve seat 600, which is up and down in FIG. 1. Thus, pneumatic, such as hydraulic fluid, acting on the membrane 120, or a solenoid acting directly on the master valve 400, can reliably open and close the master valve 400, which in turn controls the slave valve 500.

According to one embodiment, the master valve 400, the slave valve 500, and the valve seat 600 may all be co-axial arranged within the housing 150. The master valve 400, the slave valve 500, and the valve seat 600 may all be substantially cylindrical in shape. The membrane 120 may also be co-axially arranged within the housing 150, and may also be substantially cylindrical in shape.

According to one embodiment, the drain valve may further comprise the pressurised fluid chamber 100, and the pressurised fluid chamber 100 may comprise a filter 110. The drain valve does normally not comprise the pressurised fluid chamber 100 and the filter 110, but may be an integrated part of the pressurised fluid chamber 100 with, or without, the filter 110.

According to one embodiment, the collection chamber 200 may have a volume 220 that is further away from the master valve seat 610 than one or more passages 210 are away from the master valve seat 610. The one or more passages 210 may be from the volume 220 to the master valve seat 610. The one or more passages 210 are for leading collected fluid from the collection chamber 200 to the vent chamber 300. The vent chamber 300 may have one or more vent passages 310 for venting the fluid out to the atmosphere. The one or more vent passages 310 are for venting out fluid into the vent chamber 300. The one or more vent passages 310 may extend from the master valve seat 610 to the vent chamber 300. The vent chamber 300 may in turn have one or more openings to allow the collected fluid to vent. This may be done via a valve, for example a back stop valve. The collected fluid may be vented into a container. The one or more passages 210 may extend between a first plane, an upper and horizontal plane in FIGS. 2 and 3, on which the slave valve seat 620 is, and a second plane, a lower and horizontal plane in FIGS. 2 and 3, on which the master valve seat 610 is. The position of the one or more passages are limited to be between these two planes, and go thus not below the master valve seat 610, or above the slave valve seat 620, with regard to the orientation in FIGS. 2 and 3. As may best be taken from FIG. 3 the volume 220 is higher up, closer to the pressurised fluid chamber 100, than the one or more passages 210. The collection chamber 200 is for collecting the fluid, which may be a mixture of gas and liquid. The volume 220 of the collection chamber 200 may thus mostly hold gas, while the lower part, lower in FIG. 3, the one or more passages 210, mostly holds liquid. When the master valve 400 is opened, then the pressurised gas in the higher volume 220 blows out the lower liquid in the one or more passages 210. This allows for a fast and proper exit of the drained fluid, for example liquid, for example water in a fluid of breathing air. The pressurised gas may also exit through the master valve 400 and vent out, because the vent chamber 300 has a low pressure, for example atmospheric pressure, e.g. 100 kPa (1 bar). To arrange the one or more passages 210 lower, with reference to the layout in FIGS. 2 and 3, in the direction of gravity, than the volume 220, an upper part, of the collection chamber 200 creates a fast and effective ventilation, exit, of the collected fluid, even when the fluid is a mixture of liquid and gas. The collection chamber 200 may be substantially in the shape of a hollow cylinder encircling the slave valve 500. With reference to FIG. 3, the collection chamber 200 may be above the master valve seat 610, that is above the horizontal plane in which the master valve seat 610 lies. The upper part, the volume 220, of the collection chamber 200 may be the upper part of the hollow cylinder encircling the slave valve 500. The one or more passages 210 may be passages going from the hollow cylinder, preferably from the lower part of the collection chamber 200, to the master valve seat 610. When venting of fluid collected in the collection chamber 200 is made, then the collected fluid may go from the collection chamber 200, in the shape of the hollow cylinder, directly passing through the one or more passages 210, directly passing the master valve seat 610 and the master valve 400, and directly out to the vent chamber 300, or directly out to the vent chamber 300 via the one or more vent passages 310. The vent chamber 300 may also be correspondingly shaped as a hollow cylinder. The vent chamber 300 may have the one or more vent passages 310 from the master valve seat 610 to such a vent chamber 300 shaped as a hollow cylinder, the hollow cylinder in turn having openings to a low pressure environment, for example atmospheric pressure, e.g. 100 kPa (1 bar).

According to one embodiment, the valve seat 600 may be integrated into a base of a filtration assembly 160, or may be remotely mounted and piped from the filtration assembly 160. The valve seat 600 may be arranged into the housing 150, which in turn is integrated into the base of the filtration assembly 160, or may be remotely mounted and piped from the filtration assembly 160.

According to one embodiment, the slave valve seat 620 may be situated on a surface of the valve seat 600. The surface may be the surface closest to the pressurised fluid chamber 100. The surface may have a circumferential protrusion extending upwards in FIGS. 1-3 that contacts and may seal against the slave valve 500. In this way, an effective, reliable, and low maintenance shut off is achieved.

According to one embodiment, a method is disclosed for draining a pressurised chamber with a drain valve according to any one single or combined embodiments disclosed herein. The drain valve comprises a collection chamber 200 for collecting pressurised fluid from the pressurised fluid chamber 100; a vent chamber 300 for venting the pressurised fluid from the collection chamber 200, preferably out to atmospheric pressure; a master valve 400 between the collection chamber 200 and the vent chamber 300; and a slave valve 500 between the pressurised fluid chamber 100 and the collection chamber 200. The master valve 400 is configured to open the slave valve 500 when the master valve 400 is closed, and to close the slave valve 500 when the master valve 400 is open. The master valve 400 is, preferably solely, configured to open the slave valve 500, preferably while the master valve 400 is closed, to allow pressurised fluid from the pressurised fluid chamber 100 to enter the collection chamber 200, and configured to close the slave valve 500, preferably while the master valve 400 is open, to allow pressurised fluid from the collection chamber 200 to enter the vent chamber 300. The master valve 400 and the slave valve 500 cannot be shut at the same time. The method comprises switching between a first mode and a second mode in any order. The first mode is closing the master valve 400 and opening the slave valve 500 to collect pressurised fluid in the collection chamber 200. The second mode is closing the slave valve 500 and opening the master valve 400 to vent pressurised fluid from the collection chamber 200 to the vent chamber 300. The two modes are illustrated by FIG. 4, where the first mode may be item 710 and the second mode may be item 720.

FIG. 2 illustrates the first mode, the normal running, where the master valve 400 is closed and the slave valve 500 is open. Here the collection chamber 200 charges to, fills up with, the fluid, for example high pressure with condensate and high pressure gas mix. Note that the spring retaining plate 520 has a number of through holes 530 drilled in it which allow fluid to pass as illustrated by line 550. Only one through hole 530 is shown in FIG. 2.

FIG. 3 illustrates the second mode, the draining, where the where the master valve 400 is open and the slave valve 500 is closed. Here the fluid in the collection chamber 200 is venting out to the atmosphere as illustrated by line 450. The method with the first mode and the second mode is also illustrated by FIG. 4. The first mode may be item 710 and the second mode may be item 720. Alternatively, the first mode may be item 720 and the second mode may be item 710.

According to one embodiment, the method comprises switching between the first mode, which is closing the master valve 400 and opening the slave valve 500 to collect pressurised fluid in the collection chamber 200, and the second mode, which is closing the slave valve 500 and opening the master valve 400 to vent pressurised fluid from the collection chamber 200 to the vent chamber 300. The first mode may be called the normal running mode, with pilot air applied. The second mode may be called the drain and idle mode, with no pilot air actuation. The pilot air, or any other fluid from a pneumatic system, may thus be used to flex the flexible membrane 120 and actuate the master valve 400.

According to one embodiment, the first mode may comprise applying pilot air 130, or any other fluid from a pneumatic system, to the flexible membrane 120 to actuate the master valve 400. The pilot air may be sealed from the master valve 400 by the flexible membrane, for example a diaphragm, but exerts a force on the master valve 400 by pushing the membrane 120 connected to the master valve 400 upwards in FIG. 1. The master valve 400 may be held shut during a time period isolating the collection chamber 200 and vent chamber 300 from each other. The needle or extended nose of the master valve 400 lifts the slave valve 500 from the slave valve seat 620, which may allow the collection chamber 200 to be charged with a fluid, for example a mix of high pressure gas and liquid, as indicated by line 550. The collection chamber 200 may stay at high pressure, gradually filling with liquid along line 550 via the drain tube 140 as the liquid falls to the bottom of the pressurised fluid chamber 100. The first mode is illustrated in FIG. 2.

According to one embodiment, the second mode may comprise removing pilot air, or any other fluid from a pneumatic system, from the flexible membrane 120. During the drain period, pilot pressure may be removed from the flexible membrane 120. The high pressure in the collection chamber 200, and the spring 510, may push the master valve 400 open. As this happens the slave valve 500 is no longer held open by the master valve 400. The slave valve may be assisted by the spring 510 and may close onto the slave valve seat 620, thereby sealing the pressurised fluid chamber 100 from the collection chamber 200. This may prevent the pressurised fluid chamber 100 and any filter 110 therein from experiencing a significant pressure drop. An insignificant pressure drop may be experienced if the master valve 400 may seal against a master valve seat 610 and comprise an extension that may act directly on the slave valve 500, and that extension length may be, at least, preferably 1 to 5 millimetres more than the distance between the master valve seat 610 and a slave valve seat 620. The second mode is illustrated in FIG. 3, where the collection chamber 200 is open to the vent chamber 300. The high pressure gas of the fluid in the collection chamber 200 rapidly expands propelling the separated liquid of the fluid out into the vent chamber 300 as illustrated by line 450 in FIG. 3. The drain valve remains in this state until the pilot air is reapplied, the master valve 400 closes. This may be after 7, 20 or 30 seconds and the lengths of the period of time makes no difference for the insignificant pressure drop in the pressurised fluid chamber 100 or the amount of liquid drained from the fluid in the pressurised fluid chamber 100 by the drain valve.

According to one embodiment, when pilot air is reapplied, or any other fluid from a pneumatic system, to the membrane 120 then the master valve 400 closes again, isolating the collection chamber 200 from the vent chamber 300, and opening the slave valve 500 to allow the collection chamber 200 to charge, to be filled with fluid. The drain valve has thus returned to the first mode. For example if the compressor stops, then the pilot pressure is removed and the drain valve returns to the second mode.

According to one embodiment, when a compressor is not used for a period of time, then the drain valve may remain in the second mode for that period of time. There is thus no leakage during this time. Even if the slave valve will have a small leakage, then that is acceptable. For example, retaining 75 percent of pressure for a period of more than 24 hours would be acceptable. It is not expected that the pressurised fluid chamber 100 will stay at maximum pressure indefinitely. Thus, at least one embodiment provides a drain valve and method that allows the chamber to maintain, or substantially maintain, the pressure, not only during use of the compressor but also when the compressor is not running.

According to one embodiment, a time duration of the first mode may be forty times, or more, than a time duration of the second mode. According to one embodiment, the switching between the two modes may be made only by operating the master valve 400. According to one embodiment, the master slave 400 may be operated by a pilot fluid 130 from a compressor 130 for the pressurised chamber 100, or a solenoid mechanism 130. According to one embodiment, only a pneumatic signal 130 from the compressor for the pressurised chamber 100 may be used for switching between the first mode and the second mode. One or more of these embodiments may be combined with any other embodiment disclosed herein.

According to one embodiment, a time duration of the first mode may be forty times, or more, than a time duration of the second mode. The preferred way of operating the drain valve is to operate the first mode for a longer period than the second mode. However, the drain valve would still drain fluid if the first and second modes have the same time duration; or if the second mode is operated for a longer time duration than the first mode. Preferably, a duration, a period of time, of the first mode may be, for example 20 minutes and a duration of the second mode may be, for example 5-30 seconds, or correspondingly reduced or prolonged, i.e. the duration of first mode is preferably forty times longer than the duration of the second mode. The first mode can run for a long time, for example 12 or 24 hours, or during, or always during, normal operation, while the second mode can run for a short time, for example during, or only during, shutdown. At least one embodiment or combination of embodiments, of the drain valve allows these two modes to be used as described above. According to one embodiment, the first mode is longer than the second mode, for example running the first mode for the majority of the time and the second mode for a short period to vent and during shutdown. This is advantageous because the compressor drain system pneumatic signal 130 may be used for controlling the drain valve. According to one embodiment, the first mode is shorter than the second mode, for example running the second mode for the majority of the time and the first mode for about 20 seconds before again going into the second mode, and remaining in the second mode for shut down. This is advantageous if the drain valve was to be operated by a solenoid directly acting on the master valve, rather than a pneumatic signal. These embodiments achieve a very good and reliable drainage with a very low power consumption and maintenance requirement of the drain valve, as well as no, or substantially no, pressure drops during draining and venting.

According to one embodiment, in operation the drain valve may be installed in a compressor set assembly and pilot air may be provided from the first stage of a compressor for the pressurised fluid chamber 100. The compressor drain system may use the pilot air, as a pneumatic signal 130, to hold the compressor drain valves shut, the compressor therefore loads. This pilot air can be removed from holding the drain valves shut, for example via a solenoid valve known as the drain solenoid during the drain period, that is the time the compressor drains for, for example 7 seconds every 20 minutes running. This drain period may be adjustable for different compressors and climatic conditions. The system can be considered as fail safe because when the compressor stops pilot air is not longer available and the compressor unloads automatically. For simplicity of integration with existing packages, for example compressors set assemblies, the drain valve may be configured to operate on the same pilot air circuit with the same drain solenoid as the existing packages uses.

According to embodiments described herein, the drain valve may keep the pressurised fluid chamber 100 to which it is attached, or integrated into, effectively closed at all time, whether a pneumatic signal is present or not. According to embodiments described herein, the drain valve removes, by its configuration and function, a certain amount of fluid at each switch between the first mode and the second mode, with no, or minimal, pressure drop within the pressurised fluid chamber 100. According to embodiments described herein, only one valve of the master valve 400 or the slave valve 500 operates the other. According to embodiments described herein, the drain valve may require only a single pneumatic signal for full operation. According to embodiments described herein, the drain valve may require no additional control system or power supply to fully operate and drain.

It will be apparent to those skilled in the art that various modifications and variations can be made to the disclosed apparatus and method. Other embodiments will be apparent to those skilled in the art from consideration of the specification and practice of the disclosed apparatus and method. Any embodiment disclosed herein may be combined with any other embodiment. The method may use any combination of embodiments of the drain valve. It is intended that the specification and examples be considered as exemplary only, with a true scope being indicated by the following claims and their equivalents.

LIST OF ELEMENTS

100 pressurised fluid chamber
110 filter
120 membrane
130 pilot fluid, pneumatic signal, solenoid mechanism
140 drain pipe
150 housing
160 filtration assembly
200 collection chamber
210 one or more passages
220 volume
300 vent chamber

310 one or more vent passages
400 master valve
450 fluid venting to atmosphere
500 slave valve
510 spring
520 spring retaining plate
530 through holes
550 fluid drained into collection chamber
600 valve seat
610 master valve seat
620 a slave valve seat
710 first mode
720 second mode

What is claimed is:

1. A drain valve for a pressurised fluid chamber, comprising:

a collection chamber for collecting pressurised fluid from the pressurised fluid chamber;

a vent chamber for venting the pressurised fluid from the collection chamber;

a master valve between the collection chamber and the vent chamber; and a slave valve between the pressurised fluid chamber and the collection chamber;

wherein the master valve opens the slave valve when the master valve is closed, and closes the slave valve when the master valve is open;

wherein the master valve directly contacts the slave valve to open the slave valve to allow the pressurised fluid from the pressurised fluid chamber to enter the collection chamber, and closes the slave valve to allow the pressurised fluid from the collection chamber to enter the vent chamber; and wherein the master valve and the slave valve cannot be shut simultaneously.

2. The drain valve according to claim 1, further comprising a valve seat, including a master valve seat and a slave valve seat.

3. The drain valve according to claim 2, further comprising a spring, a force of the spring urging the slave valve against the slave valve seat.

4. The drain valve according to claim 3, wherein the slave valve further comprises a spring retaining plate that includes through holes.

5. The drain valve according to claim 2, wherein the slave valve comprises a material to seal against the slave valve seat, and the material is softer than a material of the master valve.

6. The drain valve according to claim 2, wherein the master valve moves at least partly within the valve seat.

7. The drain valve according to claim 2, wherein the master valve, the slave valve, and the valve seat are all co-axially arranged.

8. The drain valve according to claim 1, wherein the pressurised fluid chamber comprises a filter.

9. The drain valve according to claim 2, wherein the collection chamber is further away from the master valve seat than one or more passages which extend from the collection chamber to the master valve seat.

10. The drain valve of claim 2, wherein the valve seat is integrated into a base of a filtration assembly, or remotely mounted and piped from a filtration assembly.

11. A method for draining a pressurised fluid chamber, comprising:

providing a drain valve with a collection chamber for collecting pressurised fluid from the pressurised fluid chamber, a vent chamber for venting the pressurised fluid from the collection chamber, a master valve between the collection chamber and the vent chamber, and a slave valve between the pressurised fluid chamber and the collection chamber, wherein the master valve directly contacts the slave valve to open the slave valve when the master valve is closed, and closes the slave valve when the master valve is open, wherein the master valve opens the slave valve to allow the pressurised fluid from the pressurised fluid chamber to enter the collection chamber, and closes the slave valve to allow the pressurised fluid from the collection chamber to enter the vent chamber, and wherein the master valve and the slave valve cannot be shut simultaneously; and switching between a first mode and a second mode in any order, wherein, in the first mode, the master valve is closed and the slave valve is open to collect the pressurised fluid in the collection chamber, and wherein, in the second mode, the slave valve is closed and the master valve is open to vent the pressurised fluid from the collection chamber to the vent chamber.

12. The method of claim 11, wherein a time duration of the first mode is forty times, or more, than a time duration of the second mode.

13. The method of claim 11, wherein the switching is only achieved by operating the master valve.

14. The method of claim 13, wherein the master valve is operated by a pilot fluid from a compressor for the pressurised fluid chamber, or a solenoid mechanism.

15. The method of claim 14, wherein only a pneumatic signal from the compressor for the pressurised fluid chamber is used for the switching between the first mode and the second mode.

16. The drain valve according to claim 2, further comprising a housing in which the collection chamber, the vent chamber, the master valve, the slave valve, and the valve seat are all disposed.

17. The drain valve according to claim 1, wherein the master valve and the slave valve are centered on and move along a common axis.

18. The drain valve according to claim 17, wherein the slave valve is positioned above the master valve on the common axis.

* * * * *